United States Patent [19]

Erhan et al.

[11] Patent Number: 5,606,010

[45] Date of Patent: Feb. 25, 1997

[54] METHODS FOR THE PREPARATION OF INHERENTLY METAL BINDING POLY-AMINE-QUINONE POLYMERS

[75] Inventors: Semih Erhan, 2301 Cherry St., Apt. 12-B, Philadelphia, Pa. 19103; Varabelambedu S. Nithianandam, Philadelphia, Pa.

[73] Assignee: Semih Erhan, Philadelphia, Pa.

[21] Appl. No.: 271,712

[22] Filed: Jul. 7, 1994

[51] Int. Cl.$^6$ .................................................. C08G 12/00
[52] U.S. Cl. .......................... 528/229; 528/125; 528/126; 528/128; 528/222; 528/422; 528/425
[58] Field of Search ..................... 528/229, 125, 528/30, 126, 222, 422, 425

[56] References Cited

U.S. PATENT DOCUMENTS

| 4,831,107 | 5/1989 | Erhan | 528/229 |
|---|---|---|---|
| 4,882,413 | 11/1989 | Erhan | 528/229 |
| 4,981,946 | 1/1991 | Erhan | 528/229 |
| 5,284,683 | 2/1994 | Erhan | 427/404 |

FOREIGN PATENT DOCUMENTS

| 434875 | 2/1943 | Japan . |
|---|---|---|
| 451631 | 1/1970 | Japan . |
| 451518 | 4/1970 | Japan . |
| 49-39000 | 4/1974 | Japan . |
| 49-41500 | 4/1974 | Japan . |
| 139079 | 7/1959 | U.S.S.R. . |
| 231114 | 3/1969 | U.S.S.R. . |

OTHER PUBLICATIONS

Nithianandam, V. S. and Erhan, S., "Quinone Amine Polymers. IX. Attempts To Synthesize Polyamine–Benzoquinone Polymers Using Air and Oxygen As Oxidizing Agents", J. Appl. Polym. Sci. 42, 2385–2389 (1991).

Baltzly, R. et al., "The Addition of Dimethylamine To Benzoquinone", J. Am. Chem. Soc. 70, 861–862 (1948).

Crosby, A. H. et al., "A Study Of An Oxidative–Amination Method For The Synthesis Of Aminoquinones", J. Am. Chem. Soc. 78, 1233–1235 (1956).

Ueda, M. et al., "Synthesis of Polyaminequinones by Vinylogous Nucleophilic Substitution Polymerization of 2, 5–Dissubstituted p–Benzoquinones with Diamines", Makromol. Chem. 180, 2813–2818 (1979).

Nithianandam, V. S. and Erhan, S., "Quinone–Amine Polymers: 10. Use of Calcium Hypochlorite In The Synthesis of Polyamine–Quinone (PAQ) Polymers", Polymer 32, 1145–1148 (1991).

Shäfer, W. et al., "Oxidative Aminierung von Hydrochinonen", Angew. Chem. 83, 441–442 (1971).

Primary Examiner—Samuel A. Acquah
Assistant Examiner—P. Hampton-Hightower
Attorney, Agent, or Firm—Eckert Seamans Cherin & Mellott

[57] ABSTRACT

The invention is an improved method for the preparation of poly-amine-quinone polymers using external oxidizing agents. The polymer produced has the general chemical formula:

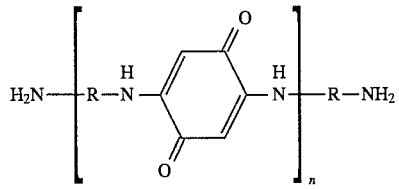

where each R is independently selected from the group of alkyl, cycloalkyl, aralkyl, aryl, silyl, siloxyl and the alkyl, alkoxy, aryl, carboxyl, amino, sulfhydryl, sulfoxyl, sulfonyl substituted derivatives thereof and n is about 50–2,000, and the molecular weight of the polymer is about 10,000 to 1,000,000, preferably about 10,000 to 40,000. The polymer can be used in anticorrosion paints and coatings, such as automotive and marine paints and coatings, and can also be used as a curing agent for epoxy resins.

38 Claims, No Drawings

5,606,010

METHODS FOR THE PREPARATION OF INHERENTLY METAL BINDING POLY-AMINE-QUINONE POLYMERS

FIELD OF THE INVENTION

The invention relates to the field of a class of inherently metal-binding polymers, such as poly-amine-quinone polymers, which have an unusual combination of properties that make them well suited as paints, coatings, binders and adhesives, and which are generally formed by reacting quinones with polyamines. More particularly, the invention relates to the field of preparation of a class of poly-amine-quinone polymers by novel polymerization methods that simplify the synthesis of these polymers and, consequently, lead to more economical methods of preparation and use.

BACKGROUND OF THE INVENTION

The deterioration of structural materials caused by exposure to the elements continues to present a constant problem for industrialized societies. Therefore, coatings of diverse formulations, which hinder or prevent deterioration, are indispensable for the maintenance and survival of nearly every construction material used in all conceivable structures from buildings to bridges, from ships to automobiles, etc. Structural materials exposed to air face cyclical changes in temperature and moisture. If such materials are left unprotected they will rust, crack, and eventually disintegrate. In similar fashion, structural materials immersed in seawater face cyclical changes in temperature and continuous exposure to water, saline, and living organisms. Such materials will electrochemically corrode, rust, foul, crack, and eventually disintegrate without substantial protection.

From the earliest times various coatings and paints based on combining pigments with unsaturated oils have been developed. During the early years of the twentieth century, coatings based on different derivatives of cellulose were introduced to provide rapidly drying paints for the automotive industry. The mass-production requirements of the automobile industry spurred continued development of rapidly drying paints. Consequently, the cellulose coatings were followed by the rapid evolution of other synthetic polymers that offered many different coatings to protect metals from corrosion.

Nevertheless, development of corrosion inhibiting coatings that spontaneously adhere to metals and their alloys, especially when the metals or alloys are wet, was an elusive goal until recently. An answer to this problem was recently discovered with the advent of a class of poly-amine-quinone polymers (otherwise known as "PAQs") which have very strong, inherent affinity to all metals and their alloys. A more detailed description of these poly-amine-quinone polymers, their functionality, and their use are described by my U.S. Pat. Nos. 4,831,107 (Erhan); 4,882,413 (Erhan); 4,981,946 (Erhan); and, 5,284,683 (Erhan). These poly-amine-quinone polymers exhibit certain unusual characteristics including:

a) extraordinary affinity towards all metals and their alloys, strong enough to displace water from wet, rusty metal surfaces;

b) total water-repellency when cured, either chemically or thermally;

c) excellent anticorrosive properties;

d) sufficient flexibility to allow a coated panel, cured with epoxy resins, to be bent on an ⅛" mandrel;

e) very good impact and abrasion resistance;

f) ability to bind to siliceous materials;

g) ability to be cast as free standing films;

h) solubility in suitable organic solvents to provide paints and coatings, especially anticorrosive automobile and marine paints and coatings, according to my U.S. Pat. Nos. 4,831,107 (Erhan); 4,882,413 (Erhan); and, 4,981,946 (Erhan);

i) ability to metallize plastics according to my U.S. Pat. No. 5,284,683 (Erhan);

j) ability to displace machine oils from metal surfaces;

k) resistance to certain organic solvents, including Skydroll®, in sodium hydroxide;

l) resistance to short wavelength ultra-violate light;

m) nonflammability; and, n) ability to conduct heat.

Several methods are known for the preparation of poly-amine-quinone polymers. One method for preparing poly-amine-quinone polymers involves the polymerization reaction of various aliphatic and aromatic polyamines with various quinones as taught by my U.S patents described hereinabove. In this method, the reaction steps include dissolving the reactant polyamine and quinone in an appropriate solvent, for instance, acetone, ethanol, or a mixture of solvents; admixing the reactant solutions in a mole ratio of polyamine to quinone preferably of about 1–2:3; refluxing the reactant solution with stirring for several hours, preferably for about 3 to 8 hours, at temperatures dictated by the chemical nature of the reactant polyamine and quinone; removing the solvent under vacuum, and recovering the poly-amine-quinone product by washing with water or solvent and drying in a vacuum oven, preferably for over 3 hours at a temperature of about 30° to 70° C.

While this method works for both aliphatic and aromatic polyamines and different quinones, certain problems accompany this preparation approach. First, because the polymerization requires oxidative conditions to prevail and because the reactant quinone can act as the oxidizing agent, two thirds of the quinone is wasted as the oxidant, rather than being incorporated into the polymer product. Second, when the oxidizing agent is benzoquinone, the reduction of benzoquinone during the polymerization reaction generates an equivalent quantity of hydroquinone, which can compete with the poly-amine-quinone polymer product for the binding sites on metals, thus decreasing the effectiveness of the poly-amine-quinone polymer coating. Therefore, the hydroquinone must be removed by extensive washing of the polymer, which consequently increases the cost of production.

Another method for preparing similar polymers involves substitution polymerization in m-cresol as taught in Ueda, M., Sakai, N. and Imai, Y., "Synthesis of Polyaminequinones by Vinylogous Nucleophilic Substitution Polymerization of 2,5Disubstituted p-Benzoquinones with Diamines", Makromol. Chem. 180, 2813 (1979). In this method, the starting materials are 2,5-dichloro-benzoquinone, 2,5-dihydroxy-benzoquinone, or 2,5-dimethoxy-benzoquinone and aromatic amines. This method is limited to a laboratory procedure, however, because of the cost of the precursors and the expense of removing the m-cresol from the product mixture.

A further method for preparing poly-amine-quinone polymers involves the reaction of stoichiometric ratios of polyamines and quinones with an external oxidizing agent, such as calcium hypochlorite as taught by Nithianandam, V. S. and Erhan, S., "Quinone-amine polymers: 10. Use of calcium hypochlorite in the syntheses of polyamine-quinone (PAQ) polymers", Polymer 32, 1145 (1991). This approach also has disadvantages, however. First, the quality of the oxidizing agent is critical, even a slight amount of moisture reduces the efficiency of the reaction dramatically. Second, this method cannot be used with aromatic diamines because they are preferentially oxidized causing unacceptable low yields. Third, once the reaction is complete, inorganic salts must be removed from the product, increasing the cost of manufacture.

A variety of other oxidizing agents capable of converting hydroquinone to benzoquinone are known. Most of these oxidizing agents, however, can only be used in water or aqueous organic solvents, which precludes their use with poly-amine-quinone polymers because such polymers are insoluble in water or aqueous solutions. Furthermore, some of the oxidizing agents, which can be used in organic media, were shown to oxidize the amine. Sodium chlorate in the presence of catalytic quantities of ammonium vanadate has been tried for the synthesis of poly-amine-quinone polymers, with some success, however, the reaction is excessively sensitive to variations in the reaction conditions. A method used in the preparation of simple aminoquinones from hydroquinone in aqueous medium, utilizing sodium iodate is taught in Schofer, W., Aguado, and A. Sezer, U., "Oxidative Aminierung von Hydrochinonen," Angew. Chem. 83, 441 (1971).

From an industrial standpoint both air and oxygen are ideal oxidizing agents due to their abundance and because they are relatively inexpensive. Earlier attempts to prepare poly-amine-quinone polymers with air and oxygen were generally unsuccessful. While polymer was produced, only a small fraction of the polymer was insoluble in water, suggesting that most of the product was oligomeric in nature as shown by Nithianandam, V. S. and Erhan, S., "Quinone Amine Polymers. IX. Attempts to Synthesize Polyamine-Benzoquinone Polymers Using Air and Oxygen as Oxidizing Agents", J. Appl. Polym. Science 42, 2385 (1991). On the other hand, simple bis-(dialkylamino)quinones were prepared using oxygen as taught by Baltzly, R. and Lorz, E., "The Addition of Dimethylamine to Benzoquinone", J. Am. Chem. Soc. 70, 861 (1948). Later studies, however, pointed out several major problems with this method. One such major problem was that the method could only be used with secondary amines having certain specific structural characteristics as taught by Crosby, A. H. and Leitz, R. H., "A Study of an Oxidative-amination Method for the Synthesis of Aminoquinones", J. Am. Chem. Soc. 78, 1233 (1956).

What is needed is a simple, efficient and economical method for the preparation of metal binding poly-amine-quinone polymers, which can be used, inter alia, as paints, coatings, binders, adhesives, and curing agents, without the drawbacks mentioned hereinabove.

The present invention alleviates the unfavorable or prohibitive economic concerns associated with scaling up to the level of commercial production the previously known methods of preparing poly-amine-quinone polymers. The present invention also alleviates, inter alia, the need for increased purification of the reaction solution to isolate the product poly-amine-quinone polymer, the need for tight control of the quality of the oxidizing agent used, and the need for more expensive precursors associated with certain other known methods for synthesizing poly-amine-quinone polymers. Moreover, unlike some of the previously known poly-amine-quinone polymer preparation methods, the present invention works for both aromatic diamine and aliphatic diamine derived poly-amine-quinone polymers. The present invention advantageously allows for the polymerization of quinones or quinone precursors (i.e., a quinone in reduced form), especially hydroquinone, with polyamines in stoichiometric ratios. The present invention also advantageously alleviates the waste of two thirds of the quinone as the oxidizing agent associated with previously known preparation methods.

SUMMARY OF THE INVENTION

It is an object of the invention to provide an improved method for the preparation of poly-amine-quinone polymers using external oxidizing agents, the polymer having the general chemical formula:

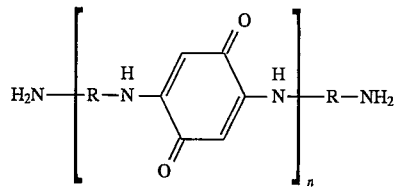

where each R is independently selected from the group of alkyl, cycloalkyl, aralkyl, aryl, silyl, siloxyl and the alkyl, alkoxy, aryl, carboxyl, amino, sulfhydryl, sulfoxyl, sulfonyl substituted derivatives thereof and n is about 50–2,000; preferably about 70–700. Advantageously, the molecular weight of the polymer is about 10,000 to 1,000,000; preferably about 10,000 to 40,000.

It is another object of the invention to provide a method for preparing poly-amine-quinone polymers that is simple and efficient, and hence, more economical for the production of these polymers in large quantities.

It is yet another object of the invention to provide a poly-amine-quinone polymer prepared by the method of the invention.

It is still another object of the invention to provide a poly-amine-quinone polymer coating, paint, or binder composition comprising a liquid solvent or vehicle and a poly-amine-quinone polymer composition prepared by the method of the invention, and optionally comprising other additives such as pigments, antioxidants, curing agents, etc.

It is also an advantage of the invention to use uniquely selected external oxidizing agents in the method of preparation of the poly-amine-quinone polymers of the invention. Some of these external oxidizing agents are for use with only aromatic polyamines. Still others are for use with either aliphatic or aromatic polyamines.

It is a further advantage of the invention to use external oxidizing agents in the polymerization reactions of both aliphatic and aromatic polyamines that enable the use of stoichiometric ratios of polyamine to quinone.

It is still another advantage of the invention to use quinone precursors in the polymerization reactions.

The invention resides in a method for the preparation of poly-amine-quinone polymers by performing addition polymerization of an effective amount of either an aromatic or aliphatic polyamine with an effective amount of a quinone or quinone precursor, preferably stoichiometric amounts of aromatic or aliphatic polyamine and quinone or quinone precursor, in the presence of an external oxidizing agent until substantially complete polymerization to a poly-amine-quinone polymer and recovering the poly-amine-quinone polymer formed, in which the oxidizing agent comprises sodium iodate, sodium chromate, sodium chlorate, or the like when reacting aromatic polyamines with quinones, and the oxidizing agent comprises air or oxygen and a trace amount of a metal salt of copper, nickel, cobalt, or vanadium and a catalytically effective amount of catechol or pyrogallol when reacting either aliphatic or aromatic amines with quinones.

DETAILED DESCRIPTION OF THE PREFERRED EMBODIMENTS OF THE INVENTION

This invention provides a method for the preparation of poly-amine-quinone polymers. The invention resides in a simple, efficient, and economical method for the polymerization of various aliphatic and aromatic polyamines, especially aliphatic and aromatic diamines, with various quinones in the presence of uniquely selected external oxidizing agents, one for use with either aliphatic or aromatic polyamines, especially aliphatic or aromatic diamines, and one for use with aromatic polyamines, especially aromatic diamines. The method of the invention allows the polymerization reaction to proceed using stoichiometric amounts (e.g., equimolar) of quinones or quinone precursors and aliphatic or aromatic polyamines starting materials.

While not wishing to be bound by theory, it is believed that the polymerization reaction between the aromatic or aliphatic polyamines and quinones or quinone precursors occurs in two steps. The first step reacts a polyamine and quinone and yields a monosubstituted, reduced quinone through 1,4 addition. The monosubstituted, reduced quinone then is oxidized in the second step to quinone in order to react with a second amine, again through 1,4 addition, which results in polymer chain growth. The external oxidizing agent is selected for a number of properties including, without limitation, nonsensitivity to moisture, compatibility in nonaqueous solutions, or preferential to oxidation of reduced quinones for chain growth rather than oxidation of aromatics or amines, which consequently allows the polymerization reaction to proceed using stoichiometric amounts of starting materials and spares quinones.

The poly-amine-quinone polymers produced by the method of the invention are of the general chemical formula:

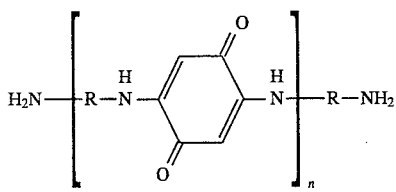

where each R is independently selected from the group of alkyl, cycloalkyl, aralkyl, aryl, silyl, siloxyl and the alkyl, alkoxy, aryl, carboxyl, amino, sulfhydryl, sulfoxyl, sulfonyl substituted derivatives thereof and n is about 50–2,000; preferably about 70–700; most of which are described in my U.S. Pat. Nos. 4,831,107 (Erhan); 4,882,413 (Erhan); 4,981,946 (Erhan); and, 5,284,683 (Erhan), which are hereby incorporated by reference herein in their entireties. Advantageously, the molecular weight of the polymer is about 10,000 to 1,000,000; preferably about 10,000 to 40,000.

The most preferred poly-amine-quinone polymers used for coating applications are polymers in which R is:

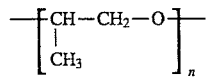

where n is about 3 to 40, preferably about 6.4, and the molecular weight is about 10,000 to 15,000.

Depending upon the characteristics of the ingredients, these polymers vary from infusible and intractable ones to those that are tacky, flexible, or brittle. Most are curable with heat, infra-red radiation, and/or chemicals. Before curing they are soluble in lower alcohols such as methanol, ethanol, propanol, etc., acetone, and dimethyl sulphoxide (DMSO), or the like, which can also act as a coating carrier, but are insoluble in water and ethyl ether or the like. They can be applied by dipping, spraying, brushing and powder melt coating. Once cured by heat, infra-red radiation, or chemicals, they are insoluble in solvents and impervious to water, salt water, boiling and autoclaving. They are non-wettable by water, and hence, ice will not adhere to them easily. They can displace water from surfaces of metals and their alloys, including dripping wet and rusted surfaces.

In one inventive aspect, the invention is directed to an improved method for preparing aromatic polyamine derived poly-amine-quinone polymers.

The method of the invention for the preparation of aromatic polyamine derived poly-amine-quinone polymers comprises a series of operations, generally as follows: (a) dissolving an aromatic polyamine and a quinone or oxidizable quinone precursor, preferably a quinone precursor, in a suitable solvent preferably in a mole ratio between the aromatic polyamine and quinone or oxidizable quinone precursor of about 1:3 to 3:1, preferably about 1:3 to 2:5, most preferably about 1:1; (b) adding an external oxidizing agent to the reaction mixture selected from the group consisting of sodium iodate, sodium chlorate, sodium chromate, or the like, preferably sodium iodate, preferably in a mole ratio of aromatic polyamine to quinone or quinone precursor to oxidizing agent of about 1:3:2 to 3:1:30, preferably about 1:3:8 to 2:5:20, most preferably about 1:1:3; (c) stirring and refluxing the reaction mixture at a temperature of about 40° to 100° C., preferably about 50°–70° C., for about 2–30 hours, preferably about 5 to 24 hours, or until substantially complete polymerization of the reaction mixture; (d) optionally concentrating the reaction mixture, under vacuum, to remove the solvent, if the solvent is volatile, and dissolving the product obtained in an appropriate solvent; (e) precipitating the polymer by pouring into water, aqueous alcohols or any other solvent in which the polymer is insoluble; and, (f) purifying the precipitated polymer product and drying, preferably in a vacuum oven. If the precipitated product is solid it can be isolated by filtering through filter paper in a funnel or a Buechner funnel and washed extensively. If the reaction product is soft or paste-like it is washed by repeated decantations. The washed product is then dried.

The external oxidizing agent which is used in the method is preferably sodium iodate (e.g., $NaIO_3$). I have discovered that the oxidizing agent does not require tight control of its quality, i.e., its efficiency is not reduced dramatically by moisture, and it does not preferentially drive the oxidation of the aromatic polyamine. Other oxidizing agents that can be used alone or in combination may include without limitation the group of:

| | | |
|---|---|---|
| chromic acid | ferric chloride | lead dioxide |
| lead tetraacetate | ceric sulfate | chromyl chloride |
| sodium dichromate | potassium dichromate | sodium chromate |
| potassium chromate | sodium nitrate | selenium dioxide |

The aromatic polyamines, especially aromatic diamines, which can be used in the method may be selected from without limitation the group of:

| | |
|---|---|
| p-phenylenediamine | m-xylenediamine |
| m-phenylenediamine | 2,5-dichloro-p-phenylenediamine |
| o-phenylenediamine | tetraaminobenzene |
| benzidine | diaminobenzidine |
| 3,3'-diaminodiphenyl | 4,4'-diaminodiphenylether |
| 3,3'-diaminodiphenylether | 4,4'-diaminodiphenylsulfoxide |
| 3-3'-diaminodiphenylsulfoxide | 4,4'-diaminodiphenylsulfone |
| 3,3'-diaminodiphenylsulfone | 1,5-diaminonaphthalene |
| 4,4'-diaminodiphenylamine | 2,6-diaminonaphthalene |
| 3,3'-diaminodiphenylamine | 4,4'-diaminobenzophenone |
| 3,3'-diaminobenzophenone | 4,4'-dianilinomethane |
| 3,3'-diaminodiphenylmethane | 2,7-diaminofluorene |
| 2,4-diaminophenyl-1,3,5-triazine | 4,4'-diaminophenylethane |
| tert-butyltoluenediamine | bis-(p-aminophenoxy)diamethylsilane |
| bis-(3-aminopropyl)tetramethyldisiloxane | 4,4'-diamino-1,1'-binaphthyl |
| 2,4,6-triaminopyrimidine | 1,3-bis(3-aminophenoxy)benzene |
| 1,4-bis(4-aminophenoxy)benzene | 1,3-bis(4-aminophenoxy)benzene |
| 4,4'-bis(4-aminophenoxy)-diphenyl | bis'-(4-[4-aminophenoxy]phenyl)ether |
| 2,2'-bis(4-aminophenyl)hexafluoropropane | 2,2'-bis(3-amino-4-methylphenyl)hexafluoropropane |
| 3,3'-dihydroxy-4,4'-diamino-diphenyl | 3,3'-diamino-4,4'-dihydroxydiphenyl |
| 3,3',4,4'-tetraaminodiphenyl | 2,2'-bis(trifluoromethyl)benzidine |
| 2,2'bis[4-(4-aminophenoxy)phenyl]propane | 1,4-bis(4-aminophenoxy)diphenylsulfone |
| 1,4-bis(3-aminophenoxy)diphenylsulfone | 1,3-bis[2-(4-aminophenyl)propyl]benzene |
| 1,4-bis[2-(4-aminophenyl)propyl]benzene | 2,2-bis(3-amino-4-hydroxypehnyl)hexafluoropropane |
| bis(4,4'-diamino-3,3'-dichlorophenyl)methane | |
| 2,2'-bis[4-(4-amino-2-trifluorophenoxy)phenyl]hexafluoropropane | |

The quinones or quinone precursors which can be used in the method may be selected from without limitation the group of:

| Quinones | Quinone Precursors |
|---|---|
| p-benzoquinone | hydroquinone |
| o-benzoquinone | catechol (Chemical name 1,2-dihydroxybenzene) |
| 2-phenylquinone | 2-phenylhydroquinone |
| 2,5-diphenylquinone | 2,5-diphenylhydroquinone |
| diphenoquinone | 4,4'-dihydroxydiphenyl |
| stylbenequinone | 1,2-bis(4-hydroxyphenyl)ethane |
| homostilbenequinone | 1,4-bis(4-hydroxyphenyl)butane |
| 2,5-dichloro-3,6-dihydroxy-quinone | 2,5-dichloro-3,6-dihydroxyhydroquinone |
| 2,6-naphthoquinone | 2,6-dihydroxynaphthalene |
| 1,4,5,8-naphthodiquinone | 1,4,5,8-tetrahydroxynaphthalene |
| 2-methylquinone | 2-methylhydroquinone |
| tetrahydroxyquinone | hexahydroxybenzene |

The quinones or quinone precursors can also include their allyl, alkoxyl, aryl, hydroxyl and halo derivatives.

More particularly, the method of the invention for preparing aromatic polyamine derived poly-amine-quinones includes the following steps:

1. A selected, aromatic polyamine, preferably an aromatic diamine, from the list above is dissolved in a suitable solvent such as a lower alcohol, e.g., methanol, ethanol, propanol, etc., glycol ethers, e.g., ethylene glycol monoethyl ether, ethylene glycol monopropyl ether, etc., tetrahydrofuran (THF), mixtures thereof, or other solvents depending on the solubility of the final polymer product. The polymerization reaction is best carried out in alcoholic solutions, e.g., lower alcohols such as methanol, ethanol, propanol, or the like. Because a large number of arylaminoquinone polymers are insoluble in alcoholic solutions, however, other solvents were selected such as glycol ethers, tetrahydrofuran (THF), N-methyl-2-pyrrolidinone (NMP), and mixtures of alcohols therewith, trichloroethylene, trichloropropane, or the like, depending on the solubility of the final polymer.

2. A selected quinone or quinone precursor is dissolved separately from, or together with, the aromatic polyamine in a suitable solvent such as a lower alcohol, e.g., methanol, ethanol, propanol glycol ethers, tetrahydrofuran (THF), mixtures thereof or other solvents depending on the solubility of the final polymer. If a quinone precursor such as hydroquinone is used, oxidation to a quinone is preferably effected by the oxidative reaction conditions, or, additionally, by oxidation with air, oxidizing agents or enzymes prior to mixing with the selected, aromatic polyamine, 3. The reactant solution is preferably provided in a mole ratio of aromatic polyamine to quinone or quinone precursor of about 1:3 to 3:1, preferably about 1:3 to 2:5, most preferably about 1:1.

4. An external oxidizing agent of sodium iodate is added to the reaction mixture, preferably in a mole ratio of aromatic polyamine to quinone or quinone precursor to oxidizing agent of about 1:3:2 to 3:1:30, preferably about 1:3:8 to 2:5:20, most preferably about 1:1:3.

5. The reaction mixture is continually stirred and refluxed at a temperature of about 40°–100° C., preferably about 50°–70° C., for about 2–30 hours, preferably about 12–18 hours, or until the polymerization reaction is substantially complete.

6. If the reaction solvent is volatile, the reaction mixture is concentrated under vacuum to remove the solvent. The concentrated mixture is then dissolved in an appropriate solvent.

7. The poly-amine-quinone polymer product is precipitated using an appropriate liquid, one in which the polymer product is insoluble (e.q., water, methanol, ethanol, propanol, water-alcohol mixture), and then the precipitated polymer product is filtered and washed with water.

8. The washed polymer product is dried in a vacuum oven at a temperature of about 40°–80° C. for about 4–8 hours.

The invention will further be clarified by consideration of the following examples, which are intended to be purely exemplary of the method of the invention for the preparation of poly-amine-quinone polymers derived from stoichiometric (equimolar) amounts of aromatic polyamines and quinones or quinone precursors, using an external oxidizing agent of, e.g., sodium iodate.

EXAMPLE 1

Preparation of poly(t-butyltoluenediaminoquinone) polymer

About 4.4 g (0.04 mol) hydroquinone and about 7.12 g (0.04 mol) 2,4-diamino-5-t-butyltoluene were dissolved in about 40 mL of ethyl cellosolve (chemical name ethylene glycol monoethyl ether) in a round-bottom flask fitted with a reflux condenser and stirrer. Under vigorous stirring, about 23.76 g (0.12 mol) sodium iodate was added to the reaction mixture, which was continuously stirred at about 60°–65° C. for about 18 hours. At the end of the polymerization reaction, which was monitored by UV spectroscopy, the mixture was filtered through filter paper in a funnel and the poly(t-butyltoluenediaminoquinone) polymer product was precipitated by pouring into water. The product polymer was filtered through filter paper, washed with water and dried in a vacuum dessicator. The dried polymer can be purified by extraction with hexane and/or ether. Extraction with hexane removes traces of unreacted amine trapped in the polymer. Extraction with ether removes the low molecular weight polymer fraction.

EXAMPLE 2

Preparation of 1,3-bis(3-aminophenoxy)benzene-p-benzoquinone polymer

About 4.4 g (0.04 mol) hydroquinone and about 11.68 g (0.04 mol) of 1,3-bis(3-aminophenoxy)benzene were dissolved in a mixture of about 65 mL propyl cellosolve (chemical name ethylene glycol monopropyl ether) and about 15 mL of tetrahydrofuran (THF) in a round bottom flask. About 23.75 g (0.12 mol) of sodium iodate was added and the mixture was stirred for about 18 hours at about 60°–65° C. The reaction mixture was filtered through filter paper and then the 1,3-bis(3-aminophenoxy)benzene-p-benzoquinone polymer was precipitated with a about 1:4 mole mixture of methanol and water. The polymer was filtered through filter paper, washed with water and dried in a vacuum desiccator.

In another inventive aspect, the invention is directed to an improved method for preparing either aromatic or aliphatic polyamine derived poly-amine-quinone polymers.

bromide ($VBr_3$ or $VBr_3 \cdot 6H_2O$), preferably in a mole ratio of polyamine to quinone or quinone precursor to metal salt of about 1:3:0.05 to 3:1:0.0075, preferably about 1:3:0.05 to 2:5:0.005, most preferably about 1:1:0.01 and optionally catalytic amounts of oxidation catalysts (e.g., quinone precursors) selected from the group consisting of catechol (chemical name 1,2-dihydroxybenzene), pyrogallol (chemical name 1,2,3-trihydroxybenzene), or the like, preferably in a mole ratio of polyamine to quinone or quinone precursor to catalyst of about 1:3:0.5 to 3:1:0.15, preferably about 1:3:0.5 to 2:5:0.2, most preferably about 1:1:0.1; (c) adding an external oxidizing agent to the reaction mixture selected from the group consisting of oxygen and air, preferably at a flow rate of about 25 to 100 cc/min, preferably about 50 cc/min, while maintaining the reaction temperature at about 5° to 50° C., preferably about 25° to 30° C., for about 1 to 8 hours, preferably 3 to 5 hours, or until substantially complete polymerization of the reaction mixture; (d) optionally concentrating the reaction mixture, under vacuum, to remove the solvent, if the solvent is volatile and dissolving the product obtained in an appropriate solvent; (e) precipitating the polymer by pouring into water, aqueous alcohols or any other solvent in which the polymer is insoluble; and, (f) recovering the polymer product and drying, preferably in a vacuum oven. If the precipitated product is solid it can be isolated by filtering through filter paper in a funnel or a Buechner funnel and washed extensively. If the reaction product is soft or past-like it is washed by repeated decantations. The washed product is then dried.

The external oxidizing agent which is used in the method can be air or oxygen and is preferably combined with metal salts and oxidation catalysts to facilitate polymerization, especially while using stoichiometric amounts of polyamine and quinone or quinone precursor starting materials.

The aliphatic polyamines, preferably aliphatic diamines, which can be used in the method but not limited to may be selected without limitation from the group of:

| | | |
|---|---|---|
| 1,4-diaminobutane | 1,5-diaminopentane | 1,6-diaminohexane |
| 1,7-diaminoheptane | 1,8-diaminooctane | 1,9-diaminononane |
| 1,10-diaminodecane | 1,11-diaminoundecane | 1,12-diaminododecane |
| 1,14-diaminotetradecane | diethylenetriamine | triethylenetetraamine |
| 1,4-diaminocyclohexane | 1,3-diaminocyclohexane | 1,4-aminomethylcyclohexane |
| 1,3-aminomethylcyclohexane | Jeffamine ® D-400 | Jeffamine ® D-230 |
| Jeffamine ® D-2000 | Jeffamine ® D-4000 | Jeffamine ® ED-600 |
| Jeffamine ® ED-900 | Jeffamine ® ED-2001 | Jeffamine ® T-403 |
| Jeffamine ® T-3000 | 2-methylpentamethylenediamine | trimethylhexamethylenediamine |
| 4,4'-diaminocyclohexylmethane | 3,3'-diaminocyclohexylmethane | tris-(2-aminoethyl)amine |
| 2-methyl-1,2-diaminopropane | 1,4-diaminopiperazine | Kemamine ® DP 3680 |
| bis(p-aminocyclohexyl)methane | Kemamine ® DP 3695 | |
| 1,4-bis(2-amino-2-methylpropyl)piperazine | | |

The method of the invention for the preparation of aliphatic polyamine derived poly-amine-quinone polymers comprises a series of operations, generally as follows: (a) dissolving an aliphatic polyamine with a quinone or oxidizable quinone precursor, preferably a quinone precursor, in a suitable solvent, preferably in a mole ratio between the polyamine and quinone or oxidizable quinone precursor of about 1:3 to 3:1, preferably about 1:3 to 2:5, most preferably about 1:1; (b) adding external oxidizing agent enhancers to the reaction mixture including trace amounts of metal salts selected from the group consisting of copper, nickel, cobalt, vanadium, or the like, especially metal salts in their higher oxidation states, such as Cu(II), Ni(III), Co(III), V(III), e.g., copper sulfate pentahydrate ($CuSO_4 \cdot 5H_2O$), vanadium tri- The Jeffamine® aliphatic polyamines are represented by the following formula:

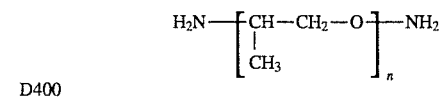

D400 where n is about 3 to 40, preferably about 6.4.

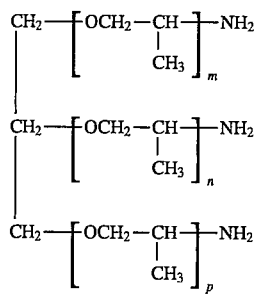

T. Series

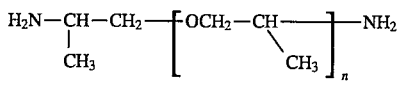

D. Series

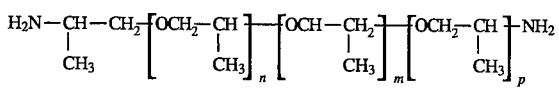

ED. Series

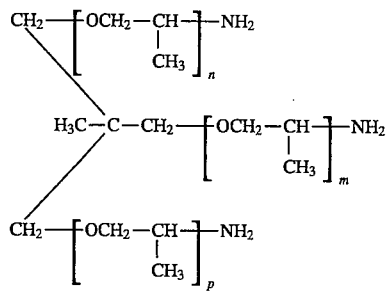

T403 where n, m, and p are each about 70 to 700.

The quinones or quinone precursors which can be used in the method may be selected without limitation from the group of:

| Quinones | Quinone Precursors |
| --- | --- |
| p-benzoquinone | hydroquinone |
| o-benzoquinone | catechol (chemical name 1,2-dihydroxybenzene) |
| 2-phenylquinone | 2-phenylhydroquinone |
| 2,5-diphenylquinone | 2,5-diphenylhydroquinone |
| diphenoquinone | 4,4'-dihydroxydiphenyl |
| stylbenequinone | 1,2-bis(4-hydroxyphenyl)ethane |
| homostilbenequinone | 1,4-bis(4-hydroxyphenyl)butane |
| 2,5-dichloro-3,6-dihydroxy-quinone | 2,5-dichloro-3,6-dihydroxyhydro-quinone |
| 2,6-naphthoquinone | 2,6-dihydroxynaphthalene |
| 1,4,5,8-naphthodiquinone | 1,4,5,8-tetrahydroxynaphthalene |
| 2-methylquinone | 2-methylhydroquinone |
| tetrahydroxyquinone | hexahydroxybenzene |

The quinones or quinone precursors can also include allyl, alkoxyl, aryl, hydroxyl and halo derivatives.

More particularly, the method of the invention for preparing aliphatic polyamine derived poly-amine-quinone polymers includes the following steps:

1. A selected aliphatic polyamine, preferably an aliphatic diamine, is dissolved in a suitable solvent such as a lower alcohol (e.g., methanol, ethanol, propanol); 1,2,3-trichloropropane; trichloroethylene; N-methyl-2-pyrolidinone (NMP); dimethylformamide (DMF); xylene; glycol ethers esters; and mixtures thereof, or other solvents depending on the solubility of the final polymer product.

2. A selected quinone or quinone precursor is dissolved separately in a suitable solvent or added to the solution from step 1. If a quinone precursor is used, such as hydroquinone, oxidation to a quinone is preferably effected by the oxidative reaction conditions, or, additionally, by oxidation with air, oxidizing agents or enzymes prior to mixing with the reactant polyamine.

3. The reactant solution is provided preferably in a mole ratio of polyamine to quinone or quinone precursor of about 1:3 to 3:1, preferably about 1:3 to 2:5, most preferably about 1:1.

4. A trace amount of a metal salt, preferably cupric salt, e.g., copper sulfate pentahydrate, or the like, and a catalytic amount of catalyst, e.g., catechol (chemical name 1,2-dihydroxybenzene), pyrogallol (chemical name 1,2,3trihydroxybenzene), or the like is added to the reactant solution preferably in a mole ratio of polyamine to quinone or quinone precursor to metal salt to catalyst of about 1:3:0.05:0.5 to 3:1:0.0075:0.3, preferably about 1:3:0.05:0.5 to 2:5:0.005:0.2, most preferably about 1:1:0.01:0.1.

5. An external oxidizing agent of air or oxygen is passed through the reaction mixture preferably at a flow rate of about 25 to 100 cc/min, preferably about 50 cc/min, for about 1–8 hours, preferably for about 3–5 hours, while controlling the reaction temperature to about 5°–50° C., preferably about 25°–30° C., until the polymerization reaction is substantially complete. The oxidizing agent can be added prior to or after either the metal salt or catalyst is added to the reaction mixture. The aliphatic polyamine derived poly-amine-quinone polymer product solution in some cases can be concentrated to appropriate concentration and can be used directly for coating purposes without further processing or can be precipitated and dried as described below.

6. If the reaction solvent is volatile, the reaction mixture is concentrated under vacuum to remove the solvent. The concentrated mixture is then dissolved in an appropriate solvent.

7. The poly-amine-quinone polymer product is precipitated using an appropriate liquid, one in which the polymer product is insoluble (e.g., water, methanol, ethanol, propanol, water-alcohol mixture), and then the precipitated polymer product is filtered and washed with water.

8. The washed polymer product is dried in a vacuum oven at a temperature of about 40°–80° C. for about 4–8 hours.

The invention will further be clarified by a consideration of the following examples, which are intended to be purely exemplary of the method of the invention for the preparation of poly-amine-quinone polymers derived from stoichiometric (equimolar) amounts of aliphatic polyamines and quinones or quinone precursors, using air or oxygen gas external oxidizing agent.

EXAMPLE 3

Preparation of
poly-(oxypropylene-diamine-benzoquinone)
polymer

About 148.5 g (1.35 mol) hydroquinone, about 16.5 g (0.15 tool) catechol, and about 600 g (1.5 mol) Jeffamine®

D-400 were dissolved in about 1800 mL of ethanol. Oxygen ($O_{2(g)}$) was passed at a flow rate of about 50 cc/min through the reaction solution for about one hour, at about 25°–30° C. The oxygen flow was then stopped and the solution was cooled to about 10°–15° C. in about 15 minutes. About 7.5 g (0.03 mol) copper sulfate pentahydrate was added to the reaction mixture while carefully controlling the temperature to about 30° C. Oxygen flow was restarted and continued while monitoring the progress of the reaction with UV spectra and TLC. Because the reaction is exothermic, efficient cooling to maintain reaction temperature around 30°–35° C. was performed. When the polymerization reaction was over, as judged by the disappearance of the hydroquinone peak in the UV spectrum, the oxygen flow was terminated. The reaction mixture was then distilled under reduced pressure to obtain the required polymer concentration. The poly-(oxypropylene-diamine-benzoquinone) polymer product solution can then either be used directly for coating purposes or the polymer may be precipitated by pouring into excess water to obtain a semi-solid material. The semi-solid material can then be washed extensively with water to remove traces of unreacted amine and hydroquinone. The polymer can then be finally dried under vacuum.

EXAMPLE 4

Preparation of
o-benzoquinone-trimethyl-hexamethylene-diamine
polymer

About 37.93 g (0.24 mol) trimethyl-hexamethylene-diamine and about 0.6 g (0.0024 mol) copper sulfate pentahydrate were dissolved in about 400 mL of methanol. About 26.4 g (0.24 mol) of catechol (chemical name 1,2-dihydroxybenzene) acting as both the quinone precursor and catalyst was added to the reactant mixture. A gentle stream of oxygen at a flow rate of about 50 cc/min was then passed through the reaction mixture for about three hours, while maintaining the reaction temperature around 20°–25 ° C. At the end of three hours the oxygen supply was cut off and the reaction mixture was concentrated under vacuum using a rotary evaporator. The o-benzoquinone-trimethyl-hexamethylene-diamine polymer was precipitated in excess water, washed extensively and dried under vacuum for about 6 hours at a temperature of about 30° C.

EXAMPLE 5

Preparation of Kemamine®-3695-p-benzoquinone
polymer

About 7.92 g (0.072 mol) hydroquinone, about 0.88 g (0.008 mol) of catechol (chemical name 1,2-dihydroxybenzene) and 51.2 g (0.08 mol) and about Kemamine® (a diamine prepared from fatty acids by Humko-Sheffield Chemical Co.) were dissolved in about 40 g of xylene. Oxygen was then bubbled through the solution slowly at a flow rate of about 30 cc/min for about two hours at about room temperature. About 0.2 g of copper sulfate (1 mol % of phenols) was added and oxygen flow was continued for about another two hours. When the hydroquinone peak disappeared in the UV spectrum, the Kemamine®-3695-p-benzoquinone product was precipitated in methanol and washed extensively with ethanol, and dried under vacuum.

EXAMPLE 6

Preparation of
poly-(2-phenyl-benzoquinone-1,12-diaminododecane)·
polymer

About 14.54 g (0.0782 mol) 2-phenyl-hydrooquinone, about 0.2 g (0.0018 mol) catechol (chemical name 1,2-dihydroxybenzene) and about 16 g (0.08 mol) 1,12diaminododecane were dissolved in a solvent mixture comprising of about 30 mL of 1,2,3trichloropropane and 60 mL of trichloroethylene. Oxygen was then passed at a flow rate of about 50 cc/min through the solution for about one hour. About 0.2 g of cupric sulfate was then added to the reaction mixture. Oxygen flow was reinstated for about an additional two hours. At the end of the polymerization reaction most of the trichloroethylene was removed under high vacuum, without raising the temperature above 35° C. This solution of poly-(2-phenyl-benzoquinone-1,12-diaminododecane) polymer can be used directly for coating purposes.

In still another inventive aspect, the invention is directed to an improved method for preparing aromatic polyamine derived poly-amine-quinone polymers using air or oxygen as the oxidizing agent.

The same oxidation method presented above for aliphatic polyamines can be applied to the preparation of poly-amine-quinone polymers by selecting reaction conditions that discourage oxidation of the aromatic amine. This is achieved by performing the polymerization under acidic conditions. Under these circumstances, however, an induction period is observed before the reaction begins. This, too, can be circumvented under appropriate conditions. This particular aspect of the invention for preparing aromatic diamine derived polymers includes the following steps: (a) dissolving an aromatic polyamine and a quinone or quinone precursor in an appropriate solvent preferably in a mole ratio between the polyamine and quinone or quinone precursor of about 1:3 to 3:1, preferably about 1:3 to 2:5, most preferably about 1:1; (b) adding an acid such as formic, acetic, propionic, and the like, preferably in a mole ratio of acid to polyamine of about 1:2 to 4:1, preferably 2:1; (c) adding a trace amount of a metal salt, preferably cupric salt, e.g., cupric sulfate pentahydrate, or the like, and a catalytic amount of catechol, pyrogallol, or the like, at a mole ratio of polyamine to quinone or quinone precursor to metal salt to catalyst of about 1:3:0.6:0.21 to 3:1:0.015:0;003, preferably about 1:3:0.5:0.07 to 2:5:0.1:0.02, most preferably about 1:1:0.2:0.05; (d) adding a trace amount of an inducer, hydrogen peroxide, sodium peroxide, manganese dioxide and the like, at 0.005 to 0.05 mole percent, preferably 0.015 mole percent; (e) adding an external oxidizing agent to the reaction mixture selected from the group consisting of oxygen and air at a flow rate of about 25 to 100 cc/min, preferably about 50 cc/min, while maintaining the reaction temperature at about 5° to about 50° C, preferably about 25° to 30° C., for about 1 to 8 hours, preferably 3 to 5 hours, or until substantially complete polymerization of the reaction mixture; (f) precipitating the polymer with water, aqueous alcohols or any solvent in which the polymer is insoluble; (g) filtering and washing the polymer; (h) drying the polymer in vacuum oven.

The invention will further be clarified by a consideration of the following example, which is intended to be purely exemplary of the method of the invention for the preparation of poly-amine-quinone polymers derived from stoichiometric (equimolar) amounts of aromatic polyamines and quino-

EXAMPLE 7

Preparation of t-butyltoluenediamine-benzoquinone polymer

About 3.56 g (0.02 mol) t-butyltoluenediamine was dissolved in about 30 mL ethyleneglycol monopropyl ether. About 2.4 mL glacial acetic acid was added followed by about 1.98 g (0.018 mol) hydroquinone, about 0.22 g (0.002 mol) catechol (chemical name 1,2-dihydroxybenzene), and about 0.2 g copper sulfate pentahydrate. About 10 drops of 1% hydrogen peroxide was added and oxygen was passed for about 5 hours, at a rate of about 40 cc/min. When the reaction was over, about 1.7 g sodium hydroxide, dissolved in about 3 mL of water was added and the mixture was stirred for about 15 min. Reaction product is obtained by pouring the reaction mixture into water and filtering the precipitated polymer and drying it in vacuo.

INDUSTRIAL APPLICABILITY

The poly-amine-quinone polymer product, especially poly-diamine quinone polymers, prepared by the method of the invention has a variety of industrial uses. In preparing paint and coating compositions for metal surfaces, the polymer may be dissolved in a suitable solvent or liquid carrier, such as lower alcohols (e.g., methanol, ethanol, propanol), dimethyl sulphoxide (DMSO), dimethylacetamide, and the like, or any other of the solvents described above depending on the solubility of the final polymer product. The polymer liquid solution for use as a coating composition may also be derived directly from the synthesis process of the polymer without precipitation and drying steps depending on the solvent used. A marine or automotive paint, or anticorrosive coating composition can be prepared from the polymers and may also include other additives such as pigments, surfactants, curing agents, etc.

The polymers can be used as anticorrosive primers; water-displacing coatings; in highway construction for coating reinforcement bars against corrosion, impregnating aggregate to reduce water uptake and pot-hole formation, coating asphalt surfaces to prevent chloride migration, and increasing adhesion of asphalt to aggregate; impregnation of wood to impart dimensional stability; high-temperature resistant adhesive and coating development; packaging of electronic components; metal-polymer composite development; water-resistant adhesion promoters; metal drawing lubricant that can simultaneously protect against corrosion; and electrically conducting polymer development.

The polymer may also be used as a binder for the metallization of plastics to provide decorative, stable, no-flake, abrasion resistant, polishable metal surfaces on plastic substrates such as for automobile bumpers or decorative jewelry. Many of these are electrically conducting, however, those that are not can be rendered electrically conductive by immersing the coated substrate in copper plating baths for use in the preparation of printed circuit boards. The polymers can also be used as curing agents to cure epoxy resins, whereby the brittleness of the epoxy resin is overcome.

The polymer compositions can be applied by dipping, spraying, brushing, wire-wound applicators, and also melt coating without a carrier. Once applied to a surface the polymer can be cured by heat between about 90° C. to about 150° C., infra-red radiation, or chemical curing by diamines or their precursors, using air or oxygen as the external oxidizing agent.

epoxides, isocyanates, zirconyl salts, titanyl salts, polyaziridines, or the like. The polymer may also be chemically modified with reactive moieties of, epoxides, phenolics, urethanes, heterocyclics, polyamides, and polysulfones or the like so that the polymer can then be used to graft other polymers such as furan resins, novolac resins, nylon resins, polyolefin resins, polysulfone resins or the like, onto the product.

The U.S. patents and the publications identified above are all incorporated by reference herein in their entireties.

The invention having been disclosed in connection with the foregoing variations and examples, additional variations will now be apparent to persons skilled in the art. The invention is not intended to be limited to the variations and examples specifically mentioned, and accordingly reference should be made to the appended claims rather than the foregoing discussion of preferred examples, to assess the spirit and scope of the invention in which exclusive rights are claimed.

We claim:

1. A method for the preparation of a poly-amine-quinone polymer, comprising;
   (a) reacting by 1,4 addition polymerization an aromatic or an aliphafic polyamine with a quinone or a quinone precursor in a mole ratio of aromatic or aliphatic polyamine to quinone or a quinone precursor in a mole ratio of aromatic or aliphatic polyamine to quinone or quinone precursor of about 1:3 to 3:1 in a solvent in the presence of an external oxidizing agent, thereby resulting in polymer chain growth, until substantially complete polymerization to a poly-amine-quinone polymer product; and,
   (b) isolating the poly-amine-quinone polymer product comprising the general chemical formula:

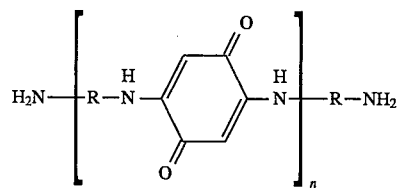

wherein each R is independently selected from the group of alkyl, cycloalkyl, aralkyl, aryl, silyl, siloxyl and the alkyl, alkoxy, aryl, carboxyl, amino, sulfhydryl, sulfoxyl, sulfonyl substituted derivatives thereof and n is about 50 to 2.000 and the molecular weight of the polymer is about 10,000 to 1,000,000.

2. The method of claim 1, in which the mole ratio of aromatic or aliphatic polyamine to quinone or quinone precursor is about 1:1.

3. The method of claim 2, in which the quinone is selected from the group consisting of:
   o-benzoquinone,
   p-benzoquinone,
   2-phenylquinone,
   2,5-diphenylquinone,
   diphenylquinone,
   stilbenequinone,
   homostilbenequinone,
   2,5-dichloro-3,6-dihydroxyquinone,
   2,6-naphthoquinone,
   1,4,5,8-naphthodiquinone,
   2-methylquinone, tetrahydroxyquinone,
and their alkyl, alkoxyl, aryl, hydroxyl and halo derivatives, and mixtures thereof.

4. The method of claim 2, in which the quinone precursor is selected from the group consisting of:
hydroquinone,
catechol (1,2-dihydroxybenzene),
pyrogallol (1,2,3-trihyclroxybenzene),
2-phenylhydroquinone,
2,5-diphenylhydroquinone,
4,4'-dihydroxydiphenyl,
1,2-bis(4-hydroxyphenyl)ethane,
1,4-bis(4-hydroxyphenyl)butane,
2,5-dichloro-3,6-dihydroxyhydroquinone,
2,6-dihydroxynaphthalene,
1,4,5,8-tetrahydroxynaphthalene,
2-methyhydroquinone,
hexahydroxybenzene,
and mixtures thereof.

5. The method of claim 2, in which the aromatic polyamine is selected from the group consisting of:

and mixtures thereof.

7. The method of claim 2, in which the solvent is selected from the group consisting of methanol, ethanol propanol, and other lower alcohols, acetone, dimethyl sulphoxide (DMSO), ethylene glycol monoethyl ether, ethylene glycol monopropyl ether, and other glycol ethers, tetrahydrofuran (THF), trichloroethylene, trichloropropane, N-methyl-2-pyrrolidinone (NMP), dimethylformamide (DMF), xylene, glycol ether esters, dimethylacetamide, and mixtures thereof.

8. A poly-amine-quinone polymer composition produced by the method of claim 2.

9. A coating composition, comprising a poly-amine-quinone polymer produced according to the method of claim 2 and a liquid solvent for the polymer.

10. The coating composition of claim 9, further comprising an additive selected from the group consisting of curing agents, pigments, surfactants, and the like.

11. A method for the preparation of an aromatic polyamine derived poly-amine-quinone polymers, comprising:
(a) reacting an effective amount of an aromatic polyamine with an effective amount of quinone or a quinone

| | |
|---|---|
| p-phenylenediamine, | m-xylenediamine, |
| m-phenylenediamine, | 2,5-dichloro-p-phenylenediamine, |
| o-phenylenediamine, | tetraaminobenzene, |
| benzidine, | diaminobenzidine, |
| 3,3'-diaminodiphenyl, | 4,4'-diaminodiphenylether, |
| 3,3'-diaminodiphenylether, | 4,4'-diaminodiphenylsulfoxide, |
| 3-3'-diaminodiphenylsulfoxide, | 4,4'-diaminodiphenylsulfone, |
| 3,3'-diaminodiphenylsulfone, | 1,5-diaminonaphthalene, |
| 4,4'-diaminodiphenylamine, | 2,6-diaminonaphthalene, |
| 3,3'-diaminodiphenylamine, | 4,4'-diaminobenzophenone, |
| 3,3'-diaminobenzophenone, | 4,4'-dianilinomethane, |
| 3,3'-diaminodiphenylmethane, | 2,7-diaminofluorene, |
| 2,4-diaminophenyl-1,3,5-triazine, | 4,4'-diaminophenylethane, |
| tert-butyltoluenediamine, | bis-(p-aminophenoxy)diamethylsilane, |
| bis-(3-aminopropyl)tetramethyldisiloxane, | 4,4'-diamino-1,1'-binaphthyl, |
| 2,4,6-triaminopyrimidine, | 1,3-bis(3-aminophenoxy)benzene, |
| 1,4-bis(4-aminophenoxy)benzene, | 1,3-bis(4-aminophenoxy)benzene, |
| 4,4'-bis(4-aminophenoxy)-diphenyl, | bis'-(4-[4-aminophenoxy]phenyl)ether, |
| 2,2'-bis(4-aminophenyl)hexafluoropropane, | 2,2'-bis(3-amino-4-methylphenyl)hexafluoropropane, |
| 3,3'-dihydroxy-4,4'-diamino-diphenyl, | 3,3'-diamino-4,4'-dihydroxydiphenyl, |
| 3,3',4,4'-tetraaminodiphenyl, | 2,2'-bis(trifluoromethyl)benzidine, |
| 2,2'bis[4-(4-aminophenoxy)phenyl]propane, | 1,4-bis(4-aminophenoxy)diphenylsulfone, |
| 1,4-bis(3-aminophenoxy)diphenylsulfone, | 1,3-bis[2-(4-aminophenyl)propyl]benzene, |
| 1,4-bis[2-(4-aminophenyl)propyl]benzene, | 2,2-bis(3-amino-4-hydroxypehnyl)hexafluoropropane, |
| 4,4'tetraaminodiphenyl, | bis(4,4'-diamino-3,3'-dichlorophenyl)methane, |
| 2,2'-bis[4-(4-amino-2-trifluorophenoxy)phenyl]hexafluoropropane, | | and mixtures thereof.

6. The method of claim 2, in which the aliphatic polyamine is selected from the group consisting of:

precursor in a solvent in the presence of an external oxidizing agent by:

| | | |
|---|---|---|
| 1,4-diaminobutane, | 1,5-diaminopentane, | 1,6-diaminohexane, |
| 1,7-diaminoheptane, | 1,8-diaminooctane, | 1,9-diaminononane, |
| 1,10-diaminodecane, | 1,11-diaminoundecane, | 1,12-diaminododecane, |
| 1,14-diaminotetradecane, | diethylenetriamine, | triethylenetetraamine, |
| 1,4-diaminocyclohexane, | 1,3-diaminocyclohexane, | 1,4-aminomethylcyclohexane, |
| 1,3-aminomethylcyclohexane, | Jeffamine ® D-400, | Jeffamine ® D-230, |
| Jeffamine ® D-2000, | Jeffamine ® D-4000, | Jeffamine ® ED-600, |
| Jeffamine ® ED-900, | Jeffamine ® ED-2001, | Jeffamine ® T-403, |
| Jeffamine ® T-3000, | 2-methylpentamethylenediamine, | trimethylhexamethylenediamine, |
| 4,4'-diaminocyclohexylmethane, | 3,3'-diaminocyclohexylmethane, | tris-(2-aminoethyl)amine, |
| 2-methyl-1,2-diaminopropane, | 1,4-diaminopiperazine, | Kenamine ® DP 3680, |
| bis(p-aminocyclohexyl)methane, | Kemamine ® DP 3695, | |
| 1,4-bis(2-amino-2-methylpropyl)piperazine, | | |

(i) dissolving the aromatic polyamine and the quinone or quinone precursor in the solvent to form a reaction mixture;

(ii) adding the external oxidizing agent selected from the group consisting of sodium iodate, chromic acid, ferric chloride, lead dioxide, lead tetraacetate, ceric sulfate, chromyl chloride, sodium dichromate, sodium chromate, potassium dichromate, potassium chromate, sodium nitrite, selenium dioxide, and mixtures thereof, to the reaction mixture;

(iii) refluxing the reaction mixture until substantially complete polymerization of the reaction mixture to an aromatic polyamine derived poly-amine-quinone polymer product; and, (b) isolating the aromatic polyamine derived poly-amine-quinone polymer product.

12. The method of claim 11, in which the mole ratio of aromatic polyamine to quinone or quinone precursor is about 1:3 to 3:1.

13. The method of claim 11, in which the mole ratio of aromatic polyamine to quinone or quinone precursor is about 1:1.

14. The method of claim 13, in which the mole ratio of aromatic polyamine to quinone or quinone precursor to external oxidizing agent is about 1:1:3.

15. The method of claim 11, in which the external oxidizing agent is sodium iodate.

16. The method of claim 11, in which the reaction mixture is maintained at a temperature of about 40° C. to 100° C.

17. The method of claim 11, in which the isolation step (b) further comprises:

(i) precipitating the aromatic polyamine derived poly-amine-quinone polymer product from the reaction mixture with water, alcohol, or other liquid in which the aromatic polyamine derived poly-amine-quinone polymer product is insoluble;

(ii) filtering and washing the precipitated, aromatic polyamine derived poly-amine-quinone polymer product with water until the wash water is substantially clear; and, (iii) drying the filtered and washed, aromatic polyamine derived poly-amine-quinone polymer product precipitate in a vacuum oven.

18. The method of claim 11, in which the isolation step (b) further comprises:

(i) concentrating the reaction mixture under vacuum to remove the solvent, leaving a concentrated reaction mixture;

(ii) dissolving the concentrated reaction mixture in an appropriate solvent;

(iii) precipitating the aromatic polyamine derived poly-amine-quinone polymer product from the reaction mixture with water, alcohol, or other liquid in which the aromatic polyamine derived poly-amine-quinone polymer product is insoluble;

(iv) filtering and washing the precipitated, aromatic polyamine derived poly-amine-quinone polymer product with water until the wash water is substantially clear; and, (v) drying the filtered and washed, aromatic polyamine derived poly-amine-quinone polymer product precipitate in a vacuum oven.

19. A method for the preparation of an aliphatic polyamine derived poly-amine-quinone polymers, comprising:

(a) reacting an effective amount of an aliphatic polyamine with an effective amount of quinone or a quinone precursor in a solvent in the presence of an external oxidizing agent by:

(i) dissolving the aliphatic polyamine and the quinone or quinone precursor in the solvent to form a reaction mixture;

(ii) adding to the reaction mixture a trace amount of a metal salt selected from the group of metal salts consisting of copper, nickel, cobalt, and vanadium, and a catalytically effective amount of a catalyst selected from the group consisting of catechol (1,2-dihydroxybenzene), pyrogallol (1,2,3-trihydroxybenzene), and mixtures thereof;

(iii) passing the oxidizing agent selected from the group consisting of air and oxygen to the reaction mixture until substantially complete polymerization to an aliphatic polyamine derived poly-amine-quinone polymer product; and, (b) isolating the aliphatic polyamine derived poly-amine-quinone polymer product.

20. The method of claim 19, in which the mole ratio of aliphatic polyamine to quinone or quinone precursor is about 1:3 to 3:1.

21. The method of claim 19, in which the mole ratio of aliphatic polyamine to quinone or quinone precursor is about 1:1.

22. The method of claim 21, in which the mole ratio of aliphatic polyamine to quinone or quinone precursor to metal salt to catalyst is about 1:1:0.01:0.1.

23. The method of claim 22, in which the external oxidizing agent of air or oxygen is passed through the reaction mixture at a flow rate of about 25 to 100 cc/min.

24. The method of claim 23, in which the reaction temperature is maintained at to about 5°–50° C.

25. The method of claim 19, in which the isolation step (b) further comprises:

(i) precipitating the aliphatic polyamine derived poly-amine-quinone polymer product from the reaction mixture with water, alcohol, or other liquid in which the aliphatic polyamine derived poly-amine-quinone polymer product is insoluble;

(ii) washing the precipitated, aliphatic polyamine derived poly-amine-quinone polymer product with water until the wash water is substantially clear; and, (iii) drying the washed aliphatic polyamine derived poly-amine-quinone polymer product precipitate in a vacuum oven.

26. The method of claim 19, in which the purification step (b) further comprises:

(i) concentrating the reaction mixture under vacuum to remove the solvent, leaving a concentrated reaction mixture;

(ii) dissolving the concentrated reaction mixture in an appropriate solvent, (iii) precipitating the aliphatic polyamine derived poly-amine-quinone polymer product from the reaction mixture with water, alcohol, or other liquid in which the aliphatic polyamine derived poly-amine-quinone polymer product is insoluble;

(iv) filtering and washing the precipitated, aliphatic polyamine derived poly-amine-quinone polymer product with water until the wash water is substantially clear; and, (v) drying the filtered and washed, aliphatic polyamine derived poly-amine-quinone polymer product precipitate in a vacuum oven.

27. The method of claim 19, in which the, isolation step (b) further comprises:

(i) concentrating the reaction mixture under vacuum to remove the solvent, leaving a concentrated reaction mixture to form a liquid polymer product.

28. A method for the preparation of an aromatic polyamine derived poly-amine-quinone polymers, comprising:
- (a) reacting an effective amount of an aromatic polyamine with an effective amount of quinone or a quinone precursor in a solvent in the presence of an external oxidizing agent by:
  - (i) dissolving the aromatic polyamine and the quinone or quinone precursor in the solvent to form a reaction mixture;
  - (ii) adding an acid selected from the group consisting of formic acid, acetic acid, propionic acid, and mixtures thereof, to the reaction mixture;
  - (iii) adding a trace amount of a metal salt selected from the group of metal salts consisting of copper, nickel, cobalt and vanadium to the reaction mixture;
  - (iv) adding a catalytic amount of a catalyst selected from the group consisting of catechol (1,2-dihydroxybenzene), pyrogallol (1,2,3-trihydroxybenzene) and mixtures thereof to the reaction mixture;
  - (v) adding a trace amount of an inducer selected from the group consisting of hydrogen peroxide, sodium peroxide, and manganese dioxide to the reaction mixture;
  - (vi) adding an external oxidizing agent to the reaction mixture selected from the group consisting of oxygen and air until substantially complete polymerization to the aromatic polyamine derived poly-amine-quinone polymer product; and,
- (b) isolating the aromatic polyamine derived poly-amine-quinone polymer product.

29. The method of claim 28, in which the mole ratio of aromatic polyamine to quinone or quinone precursor is about 1:3 to 3:1.

30. The method of claim 28, in which the mole ratio of aromatic polyamine to quinone or quinone precursor is about 1:1.

31. The method of claim 30, in which the mole ratio of aromatic polyamine to acid of about 1:2 to 4:1.

32. The method of claim 31, in which the mole ratio of aromatic polyamine to quinone or quinone precursor to metal salt is about 1:1:0.2.

33. The method of claim 32, in which the mole ratio of aromatic polyamine to quinone or quinone precursor to catalyst is about 1:1:0.05.

34. The method of claim 33, in which the inducer is added in an amount of about 0.05 to 0.005 mole percent.

35. The method of claim 34, in which the reaction temperature is maintained at about 5° to about 50° C.

36. The method of claim 35, in which the external oxidizing agent is passed through the reaction mixture at a flow rate of about 25 to 100 cc/min.

37. The method of claim 28, in which the purification step (b) further comprises:
- (i) isolation the aromatic polyamine derived poly-amine-quinone polymer product from the reaction mixture with water, alcohol, or other liquid in which the aromatic polyamine derived poly-amine-quinone polymer product is insoluble;
- (ii) washing the precipitated, aromatic polyamine derived poly-amine-quinone polymer product with water until the wash water is substantially clear; and,
- (iii) drying the washed, aromatic polyamine derived poly-amine-quinone polymer product precipitate in a vacuum oven.

38. The method of claim 28, in which the isolation step (b) further comprises:
- (i) concentrating the reaction mixture under vacuum to remove the solvent, leaving a concentrated reaction mixture;
- (ii) dissolving the concentrated reaction mixture in an appropriate solvent,
- (iii) precipitating the aromatic polyamine derived poly-amine-quinone polymer product from the reaction mixture with water, alcohol, or other liquid in which the aromatic polyamine derived poly-amine-quinone polymer product is insoluble;
- (iv) filtering and washing the precipitated, aromatic polyamine derived poly-amine-quinone polymer product with water until the wash water is substantially clear; and,
- (v) drying the filtered and washed, aromatic polyamine derived poly-amine-quinone polymer product precipitate in a vacuum oven.

* * * * *

UNITED STATES PATENT AND TRADEMARK OFFICE
CERTIFICATE OF CORRECTION

PATENT NO. : 5,606,010
DATED : February 25, 1997
INVENTOR(S) : Erhan et al

It is certified that error appears in the above-indentified patent and that said Letters Patent is hereby corrected as shown below:

Column 10, line 29, delete "past-like" and substitute therefor --paste-like--.

Column 11, in the formula D. Series, delete the top line and insert therefor

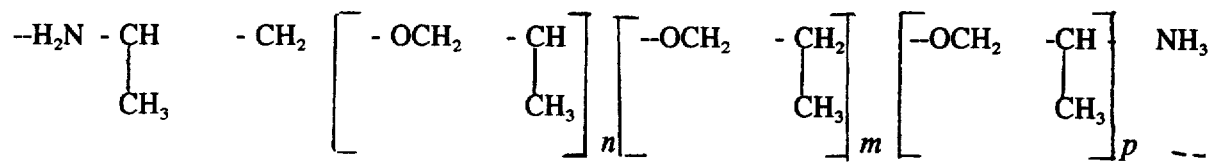

Column 12, line 67, delete "(0.15 tool)" and substitute therefor --(0.15mol)--.

Column 16, Claim 1, lines 23-26, delete "aromatic or aliphatic polyamine to quinone or a quinone precursor in a mole ratio of".

Column 16, line 53, Claim 3, delete "claim 2" and substitute therefor --claim 1--.

Column 17, line 4, Claim 4, delete "claim 2" and substitute therefor --claim 1--.

Column 17, line 8, Claim 4, delete "(1,2,3-trihyclroxybenzene)" and substitute therfor --trihydroxybenzene--.

Column 17, line 23, Claim 5, delete "claim 2" and substitute therefor --claim 1--.

UNITED STATES PATENT AND TRADEMARK OFFICE
CERTIFICATE OF CORRECTION

PATENT NO.  : 5,606,010
DATED       : February 25, 1997
INVENTOR(S) : Erhan et al Page 2 of 2

It is certified that error appears in the above-indentified patent and that said Letters Patent is hereby corrected as shown below:

Column 17, Claim 5, in the group, first column, in the line 3,3',4,4'-tetraaminodiphenyl, delete "4,4'".

Column 17, line 51, claim 6, delete "claim 2" and substitute therefor --claim 1--.

Column 18, line 2, claim 7, delete "claim 2" and substitute therefor --claim 1--.

Column 18, line 23, claim 11, after "reacting" insert --by 1,4 addition polymerization--.

Column 19, line 66, claim 19, after "reacting" insert --by 1,4 addition polymerization--.

Column 20, line 46, claim 26, delete "purification" and substitute therefor --isolation--.

Column 21, line 7, claim 28, after "reacting" insert --by 1,4 addition polymerization--.

Column 22, line 11, claim 37, delete "purification" and substitute therefor --isolation--.

Column 22, line 13, claim 37, delete "isolation" and substitute therefor --precipitation--.

Signed and Sealed this

Twenty-first Day of October 1997

Attest:

BRUCE LEHMAN

*Attesting Officer*  *Commissioner of Patents and Trademarks*